US012677243B2

(12) United States Patent
Aoyagi

(10) Patent No.: US 12,677,243 B2
(45) Date of Patent: Jul. 7, 2026

(54) SPECIFYING ANALYSIS TARGET IN ESTIMATION OF JURISDICTIONAL AREA FOR EMERGENCY REPORT

(71) Applicant: RAKUTEN MOBILE, INC., Tokyo (JP)

(72) Inventor: Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 258 days.

(21) Appl. No.: 18/574,746

(22) PCT Filed: Mar. 31, 2023

(86) PCT No.: PCT/JP2023/013647
§ 371 (c)(1),
(2) Date: Dec. 28, 2023

(87) PCT Pub. No.: WO2024/147206
PCT Pub. Date: Jul. 11, 2024

(65) Prior Publication Data
US 2025/0089004 A1 Mar. 13, 2025

(30) Foreign Application Priority Data
Jan. 6, 2023 (JP) ................................. 2023-001294

(51) Int. Cl.
*H04W 64/00* (2009.01)
*H04W 4/90* (2018.01)

(52) U.S. Cl.
CPC ............. *H04W 64/00* (2013.01); *H04W 4/90* (2018.02)

(58) Field of Classification Search
CPC ........ H04W 64/00; H04W 4/90; H04W 76/50
See application file for complete search history.

(56) References Cited

U.S. PATENT DOCUMENTS 5,602,901 A 2/1997 Redden et al.
2007/0004378 A1* 1/2007 Muhonen .............. G01S 5/0244
455/433

(Continued)

FOREIGN PATENT DOCUMENTS

EP 3634041 A1 4/2020
JP 2007251357 A 9/2007

(Continued)

OTHER PUBLICATIONS

Extended European Search Report in EP Application No. 23914697.0, dated Oct. 22, 2025, 13pp.

(Continued)

*Primary Examiner* — Nabil H Syed
(74) *Attorney, Agent, or Firm* — HAUPTMAN HAM, LLP

(57) ABSTRACT

A communication control apparatus includes a processor that performs: by an emergency report detector, detecting an emergency report from a communication device within a communication cell that includes jurisdictional areas of a plurality of emergency response agencies; by an analysis target specifier, specifying as an analysis target a time and an area different from at least either of the time and the area in which the communication device has made the emergency report; by a jurisdictional area estimator, estimating the jurisdictional area where the communication device is located, based on an analysis of at least either of the time and the area as the analysis target; and by a connection controller, connecting the emergency report to the emergency response agency of the estimated jurisdictional area. The analysis target specifier specifies as the analysis target a time in the past or a time in the future.

11 Claims, 7 Drawing Sheets

(56)  References Cited

U.S. PATENT DOCUMENTS

2020/0252781 A1*  8/2020  Edge ..................... H04W 40/20
2022/0014895 A1   1/2022  Horelik et al.

FOREIGN PATENT DOCUMENTS

JP      2019198023 A   11/2019
WO      2022087907 A1   5/2022

OTHER PUBLICATIONS

Lenovo, "Enhancing location analytics with finer granularity location information", 3GPP TSG-SA2 Meeting #154, Dummy, S2-2210824, Nov. 14-18, 2022, Toulouse, France, 8pp.
Rakuten Mobile, "New Solution: PSAP resolution using NWDAF with finer granularity than cell level", 3GPP TSG-SA2 Meeting #149E, FS_eNA Ph3 /Rel-18, Feb. 14-25, 2022, S2-2203992, 4pp.

* cited by examiner

FIG.5

Initial UE Message (/TS 38.413 NGAP)

eNB/gNB➔ AMF

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| RAN UE NGAP ID | M | | 9.3.3.2 | | YES | reject |
| NAS-PDU | M | | 9.3.3.4 | | YES | reject |
| User Location Information | M | | 9.3.1.16 | | YES | reject |
| RRC Establishment Cause | M | | 9.3.1.111 | | YES | ignore |
| 5G-S-TMSI | O | | 9.3.3.20 | | YES | reject |
| AMF Set ID | O | | 9.3.3.17 | | YES | ignore |
| UE Context Request | O | | ENUMERATED (requested, ...) | | YES | ignore |
| Allowed NSSAI | O | | 9.3.1.31 | | YES | reject |
| Source to Target AMF Information Reroute | O | | 9.3.3.27 | | YES | ignore |
| Selected PLMN Identity | O | | PLMN Identity 9.3.3.5 | Indicates the selected PLMN id for the non-3GPP access. | YES | ignore |
| IAB Node Indication | O | | ENUMERATED (true, ...) | Indication of an IAB node | YES | reject |
| CE-mode-B Support Indicator | O | | 9.3.1.156 | | YES | reject |
| LTE-M Indication | O | | 9.3.1.157 | | YES | ignore |
| EDT Session | O | | ENUMERATED (true, ...) | | YES | ignore |
| Authenticated Indication | O | | ENUMERATED (true,...) | Indicates the FN-RG has been authenticated by the access network. | YES | ignore |
| NPN Access Information | O | | 9.3.3.46 | | YES | reject |

FIG.6

User Location Information (/TS 38.413 NGAP)

| IE/Group Name | Presence | Range | IE type and reference | Semantics description | Criticality | Assigned Criticality |
|---|---|---|---|---|---|---|
| CHOICE User Location Information | M | | | | | |
| >E-UTRA user location information | | | | | | |
| >>E-UTRA CGI | M | | 9.3.1.9 | | - | |
| >>TAI | M | | 9.3.3.11 | | - | |
| >>Age of Location | O | | Time Stamp 9.3.1.75 | Indicates the UTC time when the location information was generated. | | |
| >>>PSCell Information | O | | NG-RAN CGI 9.3.1.73 | | YES | ignore |
| >NR user location information | | | | | | |
| >>NR CGI | M | | 9.3.1.7 | | - | |
| >>TAI | M | | 9.3.3.11 | | - | |
| >>Age of Location | O | | Time Stamp 9.3.1.75 | Indicates the UTC time when the location information was generated. | | |
| >>>PSCell Information | O | | NG-RAN CGI 9.3.1.73 | | YES | ignore |
| >>>NID | O | | 9.3.3.42 | | YES | reject |
| >N3IWF user location information | | | | | YES | ignore |
| >TNGF user location information | | | | | YES | ignore |
| >TWIF user location information | | | | | YES | ignore |
| >W-AGF user location information | | | | Indicates the location information via wireline access as specified in TS 23.316 [34]. | YES | ignore |

SPECIFYING ANALYSIS TARGET IN ESTIMATION OF JURISDICTIONAL AREA FOR EMERGENCY REPORT

RELATED APPLICATIONS

The present application is a National Phase of International Application Number PCT/JP2023/013647, filed Mar. 31, 2023, and claims priority based on Japanese Patent Application No. 2023-001294, filed Jan. 6, 2023.

BACKGROUND OF THE INVENTION

1. Field of the Invention

The present disclosure relates to specifying analysis target in estimation of jurisdictional area for emergency report.

2. Description of the Related Art

The number, types, and applications of wireless communication devices (hereinafter also collectively referred to as communication device(s)), represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

When a communication device such as a smartphone is used to make an emergency report to an emergency call number and the like for an emergency response agency such as a police agency or a fire department, the core network that has detected the emergency report determines the emergency response agency to which the communication device should be connected. Specifically, the core network determines the emergency response agency for connecting the emergency report, whose jurisdictional area includes the location of the communication cell (typically, the location of the base station that provides the communication cell) where the communication device is located. For example, if the base station of the communication cell is located in Area A, the emergency report from the communication device located in such communication cell will be connected to the emergency response agency A whose jurisdictional area includes Area A.

Patent Literature 1: JP-T-2021-503199

SUMMARY OF THE INVENTION

Satellite communication via communication satellite has been considered in 5G or 6G. A satellite communication cell provided by a communication satellite may exceed 20 km in diameter, which is generally larger than a terrestrial communication cell in mobile communication such as 5G or 4G (fourth generation mobile communication system). In such a case, it is assumed that jurisdictional areas of a plurality of different emergency response agencies may be included in one relatively large communication cell. For example, one large communication cell such as a satellite communication cell, could include Area A under the jurisdiction of the emergency response agency A and Area B under the jurisdiction of the emergency response agency B. If a communication device making an emergency report in such a communication cell is located in Area B, the emergency report should be connected to the emergency response agency B that has jurisdiction over Area B. However, if the base station of such a communication cell is located in Area A, the emergency report will be incorrectly connected to the emergency response agency A as described above.

The present disclosure was made in consideration of such situation, and it provides a communication control apparatus and the like that can connect an emergency report from a communication device to an appropriate emergency response agency.

A communication control apparatus in a certain aspect of the present disclosure includes at least one processor that performs, by an analysis target specifier, specifying an analysis target for estimating a jurisdictional area where a communication device is located, when detecting that a communication cell where the communication device has made an emergency report includes the jurisdictional areas of a plurality of emergency response agencies.

According to the present aspect, for an emergency report from a communication device within a communication cell that includes jurisdictional areas of a plurality of emergency response agencies, an analysis target is specified for estimating the jurisdictional area where the emergency report has been made, so that the emergency report can be connected to the appropriate emergency response agency. It should be noted that, although the above example shows a satellite communication cell as a communication cell that includes jurisdictional areas of a plurality of emergency response agencies, a terrestrial communication cell (e.g., a so-called macrocell) provided by a terrestrial base station installed on the ground can also include jurisdictional areas of a plurality of emergency response agencies. Therefore, the present aspect is applicable not only to a satellite communication cell but also to a general terrestrial communication cell.

Another aspect of the present disclosure is also a communication control apparatus. The communication control apparatus includes at least one processor that performs: by an emergency report detector, detecting an emergency report from a communication device within a communication cell that includes jurisdictional areas of a plurality of emergency response agencies; by a jurisdictional area estimator, estimating the jurisdictional area where the communication device is located, based on an analysis of a time and an area different from at least either of the time and the area in which the communication device has made the emergency report; and by a connection controller, connecting the emergency report to the emergency response agency of the estimated jurisdictional area.

Further another aspect of the present disclosure is a communication control method. The communication control method performs, specifying an analysis target for estimating a jurisdictional area where a communication device is located, when detecting that a communication cell where the communication device has made an emergency report includes the jurisdictional areas of a plurality of emergency response agencies.

Further another aspect of the present disclosure is a computer-readable medium. The computer-readable medium stores a communication control program causing a computer to perform, specifying an analysis target for estimating a jurisdictional area where a communication device is located, when detecting that a communication cell where the communication device has made an emergency report includes the jurisdictional areas of a plurality of emergency response agencies.

In addition, any combination of the above components, and any conversion of the expression of the present disclosure among methods, devices, systems, storage media, computer programs and the like are also encompassed within the present disclosure.

According to the present disclosure, an emergency report from a communication device can be connected to an appropriate emergency response agency.

BRIEF DESCRIPTION OF THE DRAWINGS

FIG. 5 shows a concrete example of an initial message from a UE.

FIG. 6 shows a concrete example of the user position information included in the initial message from the UE in FIG. 5.

DETAILED DESCRIPTION OF THE INVENTION

Figure 1:
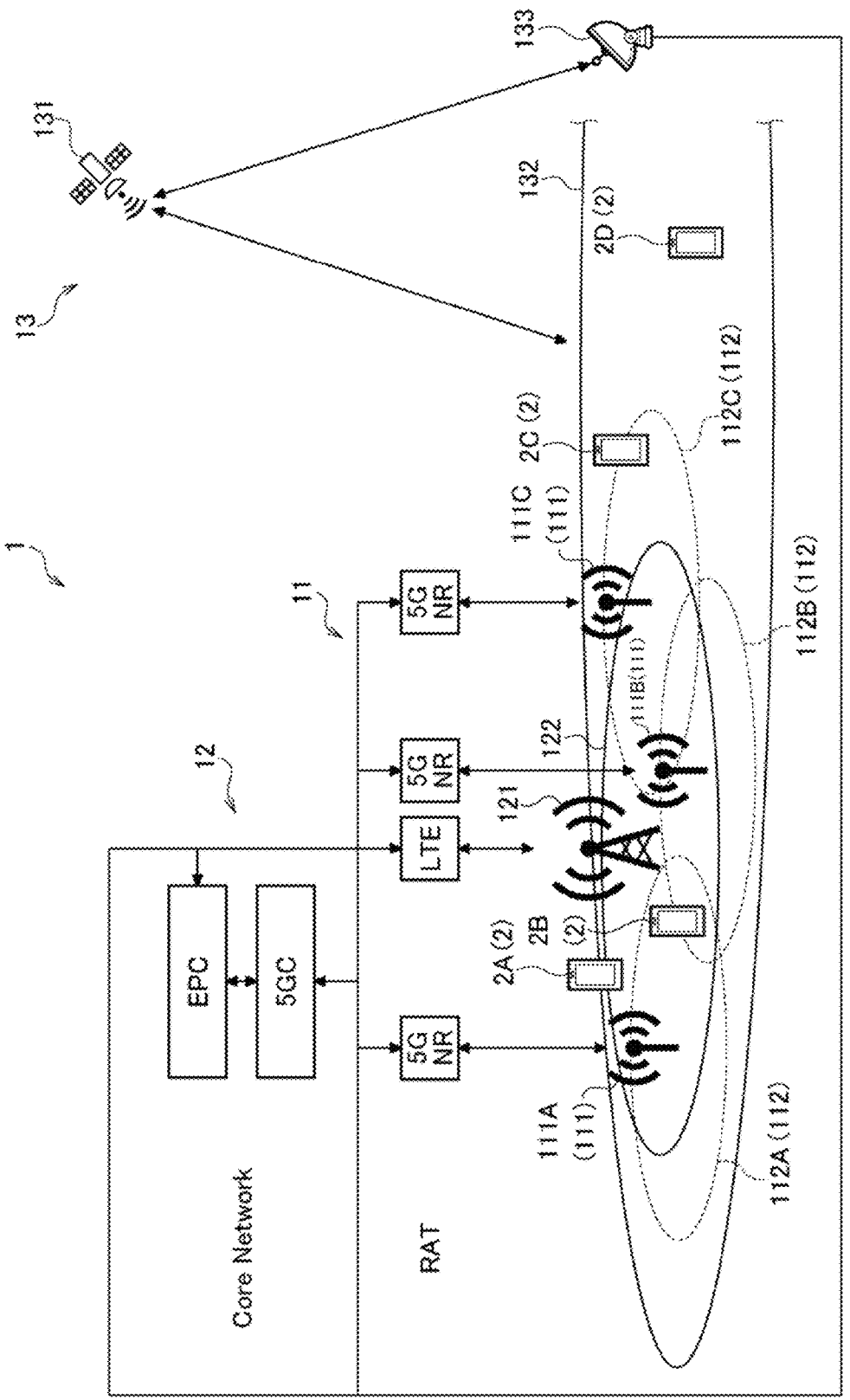
FIG. 1 schematically shows the overview of a wireless communication system to which the communication control apparatus is applied.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network (CN). 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is responsible for satellite communication via communication satellite 131. Although not shown in the figure, the wireless communication system 1 may include wireless communication networks of a generation prior to 4G, a generation later than 5G (e.g., 6G), or any wireless communication networks that are not associated with generations, such as Wi-Fi (registered trademark).

The 5G wireless communication system 11 may include a plurality of 5G base stations 111A, 111B, and 111C (hereinafter also collectively referred to as 5G base station 111) installed on the ground capable of communicating by 5G NR with communication devices 2A, 2B, 2C, and 2D (hereinafter also collectively referred to as communication device (s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter also collectively referred to as 5G cell 112).

The size of the 5G cell 112 of each 5G base station 111 is freely selected, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication device 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1). The plurality of 4G base stations 121 are installed on the ground and can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication device 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and the 4G base station 121 as terrestrial base stations that constitute the terrestrial network (TN). In such a way, the gateway 133 connects the non-terrestrial network (NTN), which includes the communication satellite 131 as a non-terrestrial base station or a satellite base station, and the terrestrial network (TN), which includes terrestrial base station 111, 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In such a way, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of about 500 km to 700 km above the ground as a flying non-terrestrial base station. However, a communication satellite flying in geostationary orbit or other higher orbit in outer space, or an unmanned or manned aircraft or a drone flying in stratosphere or other lower (e.g., about 20 km above the ground) atmosphere may be used as a non-terrestrial base station in addition to or instead of the communication satellite 131.

Figure 2A:
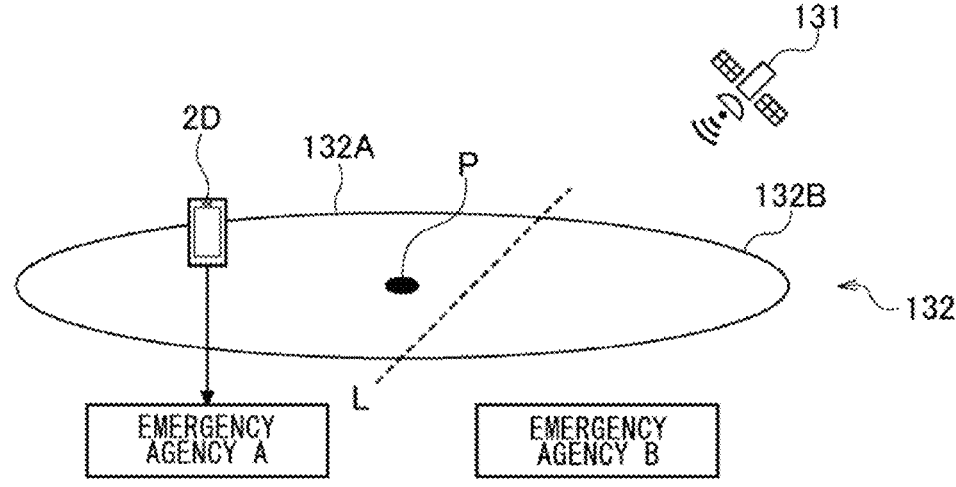
FIGS. 2A and 2B schematically show how a communication device within a satellite communication cell communicating with a communication satellite makes an emergency report to an emergency response agency.
Figure 2B:
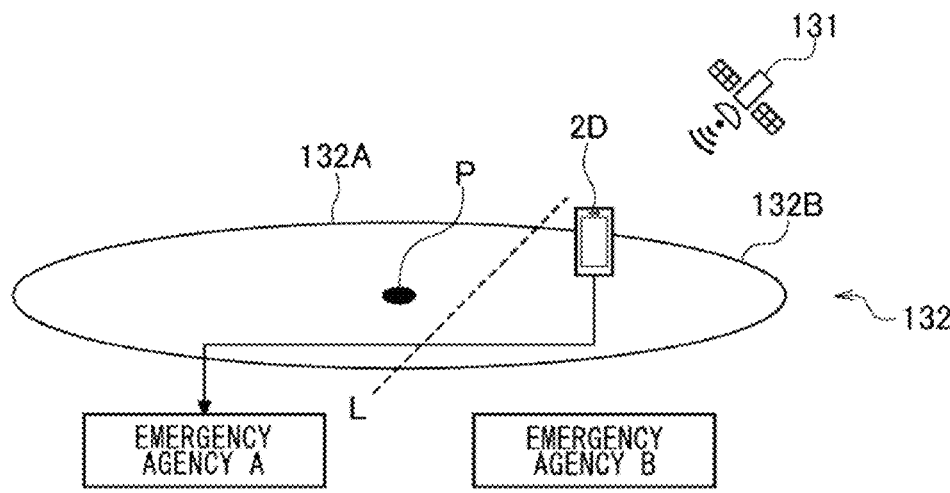

FIGS. 2A and 2B schematically show how the communication device 2D within the satellite communication cell 132 communicating with the communication satellite 131 makes an emergency report to an emergency agency (an emergency response agency) such as a police agency or a fire department. An example of an emergency report is a call to the emergency call number of each emergency agency. In Japan, "110" is assigned for emergency calls to police agencies, "119" for emergency calls to fire departments, and "118" for emergency calls to the Japan Coast Guard. The emergency report by eCall, which is an emergency report system for car accidents in Europe, is also an example of emergency report. The communication unit in the car (that corresponds to the communication device 2D shown in the figure) makes an emergency report on the wireless communication system 1 concerning the occurrence of a car accident and its location. The emergency report by Emergency Services Fallback (ES-FB) or EPS Fallback (Evolved Packet System Fallback) specified in the 5th generation mobile communication system is also an example of emergency report.

In the example shown in the figure, the satellite communication cell 132 includes the jurisdictional areas of a plurality of different emergency agencies. Specifically, the satellite communication cell 132 is divided by the boundary line L into the jurisdictional area 132A of the emergency agency A and the jurisdictional area 132B of the emergency agency B. There may be overlapping areas among the jurisdictional area 132A and the jurisdictional area 132B. P is a representative point representing the location of the satellite communication cell 132, which belongs to the jurisdictional area 132A in the example shown in the figure. The representative point P may be any point in the satellite communication cell 132, but typically it is a point near the geographical center of the satellite communication cell 132.

The location information of the representative point P of the satellite communication cell 132 can be obtained from the Cell Global Identity (CGI) of the satellite communication cell 132, which is stored in 5GC, EPC, or other core networks available for satellite communication. The CGI is the identifier or the ID uniquely assigned to each communication cell in mobile communication network or wireless communication system 1 that includes the satellite communication system 13 according to the present embodiment. The CGI consists of four parts: MCC (Mobile Country Code); MNC (Mobile Network Code); LAC (Location Area Code); and CI (Cell Identification).

MCC and MNC constitute PLMN (Public Land Mobile Network) number, which is an identifier of each wireless communication network provided by each operator in each country/region, and PLMN (number) and LAC constitute LAI (Location Area Identity), which is an identifier of the geographic location (also referred to as Geographical Identifier) of each wireless communication network. In the example of FIGS. 2A and 2B, the geographical location of the representative point P of the satellite communication cell 132 can be recognized by looking up its LAI stored in the core network, and thus it can be recognized that the representative point P belongs to the jurisdictional area 132A of the emergency agency A. Various technologies developed based on CGI such as CGI+TA, E-UTRAN CGI (ECGI), E-CGI, U-TDOA, ATI, A-GPS etc. may be used in place of or in addition to CGI.

FIGS. 2A and 2B show how the emergency report made in the satellite communication cell 132 by the communication device 2D in communication with communication satellite 131 is connected according to the representative point P detected by the core network based on the CGI. In FIG. 2A, the communication device 2D is in the jurisdictional area 132A of the emergency agency A, and in FIG. 2B, the communication device 2D is in the jurisdictional area 132B of emergency agency B. In both cases, the core network detects the emergency report from the communication device 2D, and detects the geographic location of the representative point P based on the CGI of the satellite communication cell 132, and connects the emergency report to the emergency agency A whose jurisdictional area 132A contains the representative point P. In FIG. 2A, where the communication device 2D is in the jurisdictional area 132A, the emergency report is connected to the correct emergency agency A. In FIG. 2A. However, in FIG. 2B, where communication device 2D is in jurisdictional area 132B, the emergency report is not connected to the correct emergency agency B, but to the wrong emergency agency A.

Figure 3:
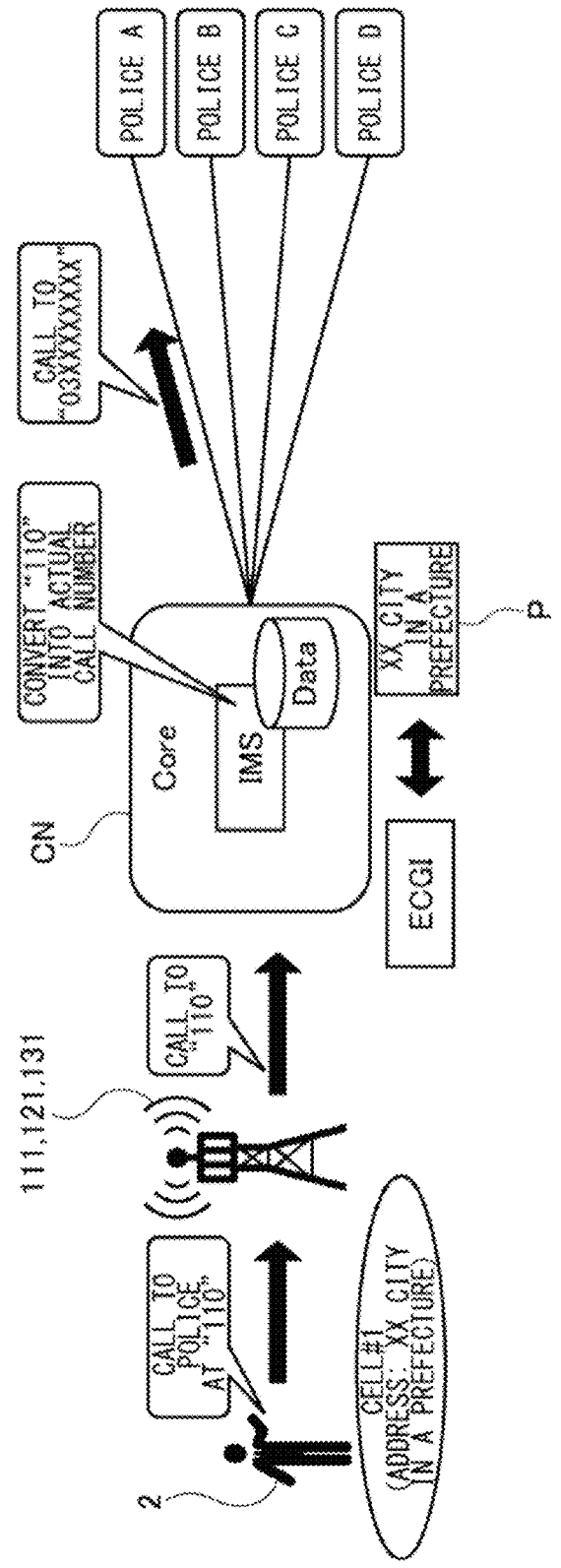
FIG. 3 schematically shows the connection process of an emergency report based on the ECGI.

FIG. 3 schematically shows the process of connecting an emergency report based on ECGI. The user of the communication device 2 is in the communication cell "Cell#1" with "xx city in A prefecture" as the representative point P, and makes an emergency call (emergency report) to the emergency call number "110" assigned to the police agency in Japan. The 5GC, EPC or other core network CN available for satellite communication receives the emergency report via the terrestrial base station 111, 121 or satellite base station 131, and in its IMS (IP Multimedia Subsystem) converts the emergency call number "110" into the actual call number of the police command center (also collectively referred to as public safety answering point (PSAP)) and the like, which is the emergency agency in charge of this emergency report. In this case, the core network CN refers to the ECGI of the communication cell (terrestrial communication cell 112, 122 or satellite communication cell 132 provided by the terrestrial base station 111, 121 or satellite base station 131) that originated the emergency report (specifically, the core network CN obtains the ECGI from the base station according to a predefined procedure or process such as "PCC based NPLI retrieval"), and recognizes the location "xx city in A prefecture" of the representative point P. As the result, the call number "110" for emergency report is converted into the actual call number "03xxxxxxxx" of "Police A" whose jurisdictional area contains "xx city in A prefecture". In this way, the emergency report to the emergency call number "110" from the communication device 2 in the communication cell "Cell#1" is connected to "Police A", the emergency agency in charge.

Figure 4:
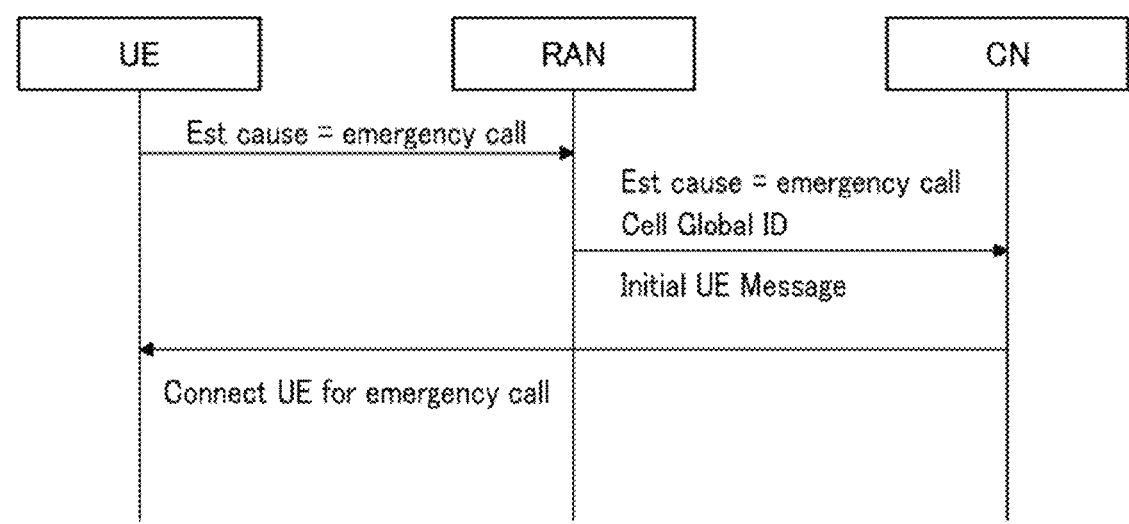
FIG. 4 shows the flow of the connection process of an emergency call based on the CGI.

FIG. 4 shows the flow of the connection process for an emergency call based on CGI. First, the UE (User Equipment), which is a communication device such as a smartphone, notifies the RAN (Radio Access Network) of the occurrence of an emergency call. The RAN is a radio access network composed of terrestrial base stations 111, 121 or satellite base stations 131. When the RAN receives an emergency call and notifies the core network CN of the emergency call, it provides the CGI of the terrestrial communication cell 112, 122 or satellite communication cell 132 that originated the emergency call to the core network CN, according to the predefined procedure such as "PCC based NPLI retrieval". The RAN that receives the emergency call also sends the Initial UE Message from the UE to the core network CN.

FIG. 5 shows a concrete example of the initial message from the UE. The initial message from the UE is sent to the AMF (Access and Mobility Management Function) included in the core network CN, from the eNB (121), which is the 4G base station connected to the UE, the gNB (111), which is the 5G base station connected to the UE, communication satellite 131, which is a satellite base station connected to the UE. FIG. 6 shows a concrete example of the user location information included in the initial message from the UE in FIG. 5. Since this user location information includes CGI information such as "E-UTRA CGI" and "NR CGI", the core network CN that receives this information can recognize the location of the representative point P of the terrestrial communication cells 112, 122 or satellite communication cell 132 that originated the emergency call. Then, the core network CN connects the emergency call from the UE to the emergency agency whose jurisdictional area contains the representative point P.

In FIGS. 3 to 6, as in FIG. 2B, since the UE (communication device 2D in FIG. 2B) is in the jurisdictional area of another emergency agency (emergency agency B in FIG. 2B) whose jurisdictional area does not include the representative point P, the emergency call is not connected to the correct emergency agency (B), but is connected to the wrong emergency agency (A) whose jurisdictional area includes the representative point P.

Figure 7:
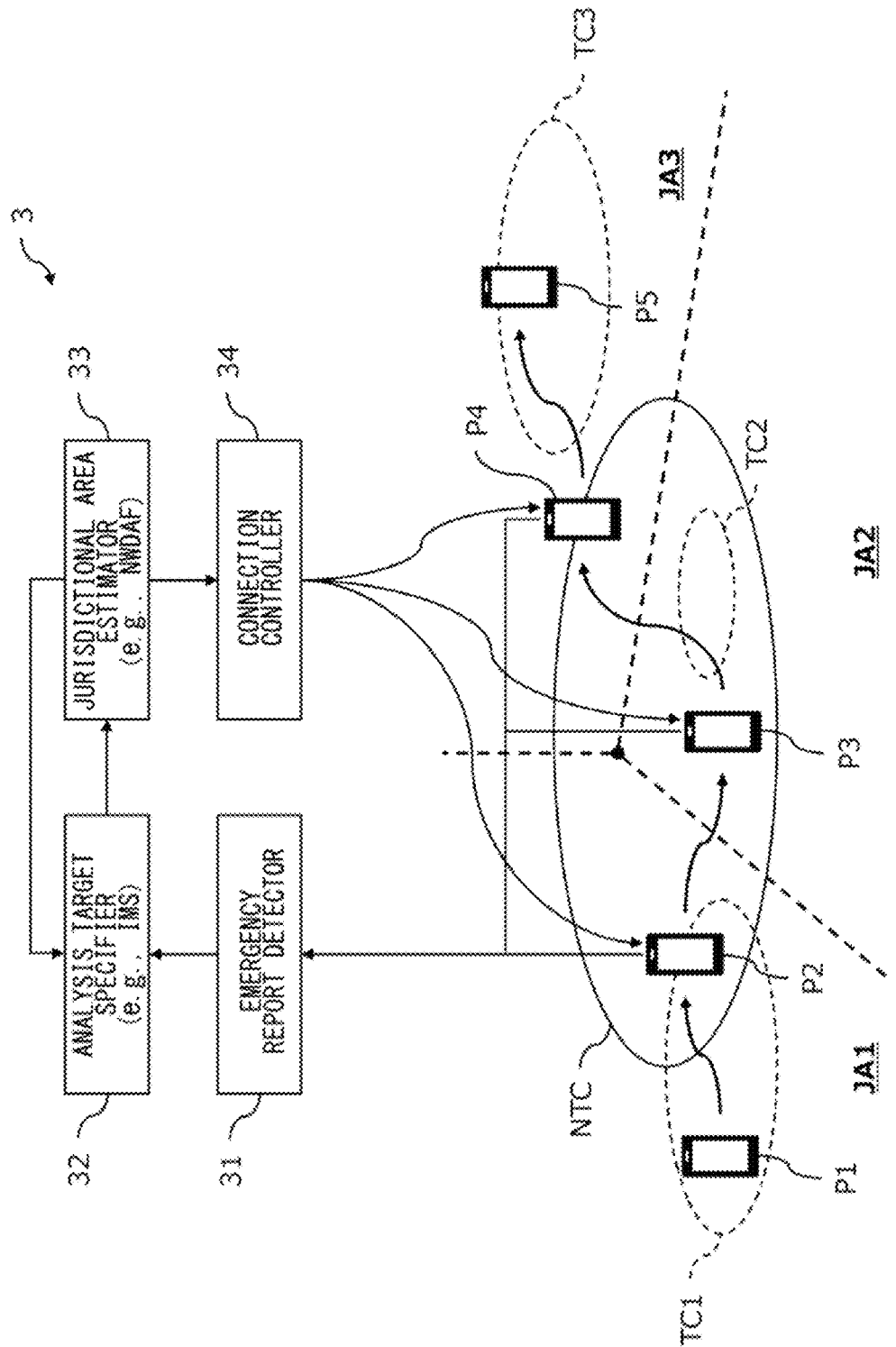
FIG. 7 is a functional block diagram of the communication control apparatus.

FIG. 7 is a functional block diagram of the communication control apparatus 3 according to the present embodiment that can solve the issues of FIGS. 2 to 6. The communication control apparatus 3 includes an emergency report detector 31, an analysis target specifier 32, a jurisdictional area estimator 33, a connection controller 34. Some of such functional blocks can be omitted as long as the communication control apparatus 3 realizes at least some of the operations and/or effects described below. Such functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in the present embodiment, some or all of functional blocks of the communication control apparatus 3 may be realized in a centralized or distributed manner by computer and/or processor provided in the communication device 2, the RAN including the base station 111, 121, 131, the gateway 133, or the core network CN.

In the example of FIG. 7, a user (not shown) of the communication device 2 moves through the first position P1, the second position P2, the third position P3, the fourth position P4, and the fifth position P5, in order. Besides, the user makes an emergency report using the communication device 2 from at least either of the second position P2, the third position P3, and the fourth position P4.

In the following, the position or the area where the emergency report is made by the communication device 2 is referred to as "present", the position or the area where the communication device 2 was located at a time before "present" is referred to as "past", and the position or the area where the communication device 2 is located at a time after "present" is referred to as "future". Specifically, if an emergency report is made by the communication device 2 at the second position P2 as the present position, the first position P1 is the past position, and the third positions P3 to the fifth position P5 are the future positions. If an emergency report is made by the communication device 2 at the third position P3 as the present position, the first position P1 to the second position P2 are the past positions, and the fourth position P4 to the fifth position P5 are the future positions. If an emergency report is made by the communication device 2 at the fourth position P4 as the present position, the first position P1 to the third position P3 are the past positions, and the fifth position P5 is the future position.

In the example shown in the figure, the second position P2 to the fourth position P4, where emergency reports are made by the communication device 2, are all included in the non-terrestrial communication cell NTC such as the satellite communication cell 132 provided by the non-terrestrial base station such as the communication satellite 131. Besides, when making an emergency report at the second position P2 to the fourth position P4, the communication device 2 in the example is assumed to be connected to the non-terrestrial base station such as the communication satellite 131 (even if there is a terrestrial base station nearby, the communication device 2 is not connected to it). In other words, the communication device 2 within the non-terrestrial communication cell NTC in the example shown in the figure, makes an emergency report to the non-terrestrial base station such as the communication satellite 131.

Similar to the satellite communication cell 132 in the example in FIGS. 2A and 2B, the non-terrestrial communication cell NTC includes the jurisdictional areas JA1, JA2, JA3 of a plurality of different emergency response agencies. As schematically illustrated in the figure, the second position P2 where the communication device 2 makes an emergency report is included in the first jurisdictional area JA1 of the first emergency response agency (not shown), the third position P3 where the communication device 2 makes an emergency report is included in the second jurisdictional area JA2 of the second emergency response agency (not shown), and the fourth position P4 where the communication device 2 makes an emergency report is included in the third jurisdictional area JA3 of the third emergency response agency (not shown). In such a case, the emergency report from the second position P2 is preferably connected to the first emergency response agency, the emergency report from the third position P3 is preferably connected to the second emergency response agency, and the emergency report from the fourth position P4 is preferably connected to the third emergency response agency.

However, as in the example in FIGS. 2A and 2B, the process based on the CGI of the non-terrestrial communication cell NTC alone cannot connect emergency reports to the appropriate first to third emergency response agencies, in accordance with the positions P2 to P4 of the communication device 2 within the non-terrestrial communication cell NTC. For example, if the CGI of the non-terrestrial communication cell NTC indicates a location within the second jurisdictional area JA2, emergency reports will always be connected to the second emergency response agency, regardless of the positions P2 to P4 of the communication device 2 within the non-terrestrial communication cell NTC. As such, in the present embodiment, as described below, the jurisdictional area estimator 33 estimates the jurisdictional area (one of JA1 to JA3) where the communication device 2 has made an emergency report, so that the emergency report is connected to the appropriate emergency response agency having such a jurisdictional area.

The vicinity or the inside of the non-terrestrial communication cell NTC such as the satellite communication cell 132, is provided with terrestrial communication cells TC1, TC2, TC3 by an unshown terrestrial base stations, which are typically smaller than the non-terrestrial communication cell NTC. The first terrestrial communication cell TC1 in the illustrated example is entirely included in the first jurisdictional area JA1 only and partly overlaps with the non-terrestrial communication cell NTC. The second terrestrial communication cell TC2 in the illustrated example is entirely included in the second jurisdictional area JA2 only and entirely overlaps with the non-terrestrial communication cell NTC (included in the non-terrestrial communication cell NTC). The third terrestrial communication cell TC3 in the illustrated example is entirely included in the third jurisdictional area JA3 only and entirely located in the vicinity (outside) of non-terrestrial communication cell NTC.

As described above, the terrestrial communication cells TC1 to TC3 in the illustrated example are located in a different manner with respect to the non-terrestrial communication cell NTC. However, the terrestrial communication cells TC1 to TC3 in the illustrated example are similar in that they are near (in proximity to) the non-terrestrial communication cell NTC. Thus, the term "near" in the present embodiment could encompass any of "partial overlap" as for the first terrestrial communication cell TC1, "entire overlap" as for the second terrestrial communication cell TC2, and "non-overlap" (but located in the vicinity) as for the third terrestrial communication cell TC3.

It should be noted that the aforementioned first position P1 is in the first terrestrial communication cell TC1, and the communication device 2 located in the first position P1 shall be connected to the first terrestrial communication cell TC1.

Besides, the aforementioned fifth position P5 is in the third terrestrial communication cell TC3, and the communication device 2 located in the fifth position P5 shall be connected to the third terrestrial communication cell TC3.

In the illustrated example, while the communication device 2 connected to the first terrestrial communication cell TC1 moves from the first position P1 to the second position P2, the connection of the communication device 2 shall be switched from the first terrestrial communication cell TC1 to the non-terrestrial communication cell NTC. Besides, while the communication device 2 connected to the non-terrestrial communication cell NTC moves from the fourth position P4 to the fifth position P5, the connection of the communication device 2 shall be switched from the non-terrestrial communication cell NTC to the third terrestrial communication cell TC3. As mentioned above, the communication device 2 that makes an emergency report at the second position P2, the third position P3, the fourth position P4 between the first position P1 and the fifth position P5, shall be connected to the non-terrestrial communication cell NTC (however, while the communication device 2 moves from the third position P3 to the fourth position P4, it may be temporarily connected to the passing second terrestrial communication cell TC2).

The emergency report detector 31 detects an emergency report from the communication device 2 within the non-terrestrial communication cell NTC that includes the jurisdictional areas JA1 to JA3 of a plurality of different emergency response agencies, via the communication satellite 131 or the like that provides the non-terrestrial communication cell NTC. In the example shown in the figure, the emergency report detector 31 detects an emergency report from the communication device 2 located at any of the second position P2, the third position P3, the fourth position P4 within the non-terrestrial communication cell NTC. As described above, since the communication device 2 that makes an emergency report at any of the second position P2, the third position P3, the fourth position P4 is connected to the non-terrestrial communication cell NTC, the main function of the emergency report detector 31 that receives an emergency report from the communication device 2 is preferably realized in a core network such as 5GC, which is available in the satellite communication system 13 and the like that provides the non-terrestrial communication cell NTC being connected.

When the analysis target specifier 32 detects that the communication cell where the communication device 2 has made an emergency report includes the jurisdictional areas of the plurality of emergency response agencies, the analysis target is specified for estimating the jurisdictional area where the communication device 2 is located. Specifically, the analysis target specifier 32 specifies as the analysis target a time and an area different from at least either of the time and the area in which the communication device 2 has made the emergency report. For example, for an emergency report made by the communication device 2 at the second position P2, a past time before the emergency report at the second position P2 or a future time after the emergency report and/or an area different from the second position P2 (e.g., an area including at least one of the first position P1, the third position P3, the fourth position P4, and the fifth position P5) are specified as the analysis target. For an emergency report made by the communication device 2 at the third position P3, a past time before the emergency report at the third position P3 or a future time after the emergency report and/or an area different from the third position P3 (e.g., an area including at least one of the first position P1, the second position P2, the fourth position P4, and the fifth position P5)

are specified as the analysis target. For an emergency report made by the communication device 2 at the fourth position P4, a past time before the emergency report at the fourth position P4 or a future time after the emergency report and/or an area different from the fourth position P4 (e.g., an area including at least one of the first position P1, the second position P2, the third position P3, and the fifth position P5) are specified as the analysis target.

The analysis target specifier 32 is preferably realized in the core network CN and can be configured by various network functions (hereinafter also referred to as NF) in the core network CN such as the IMS (IP Multimedia Subsystem), the AMF (Access and Mobility Management Function), the AF (Application Function), the P-CSCF (Proxy-Call Session Control Function).

When specifying as the analysis target an area different from the area where the emergency report has been made, the analysis target specifier 32 may specify as the analysis target other communication cell near the communication cell where the communication device 2 has made the emergency report, which includes a jurisdictional area of a single emergency response agency. As mentioned above, in the present example, the communication cell where the communication device 2 makes an emergency report is always the non-terrestrial communication cell NTC, regardless of its position (the second position P2, the third position P3, or the fourth position P4). Besides, examples of other communication cell near the non-terrestrial communication cell NTC include, as mentioned above, the first terrestrial communication cell TC1 in the "partial overlap" relationship with the non-terrestrial communication cell NTC, the second terrestrial communication cell TC2 in the "entire overlap" relationship with the non-terrestrial communication cell NTC, and the third terrestrial communication cell TC3 in the "non-overlap" (but located in the vicinity) relationship with the non-terrestrial communication cell NTC. As mentioned above, each of such "near" (or adjacent) communication cells TC1 to TC3 includes each of the jurisdictional areas JA1 to JA3 of a single emergency response agency. In other words, for each of the "near" communication cells TC1 to TC3, each of the unique jurisdictional areas JA1 to JA3 is determined.

As described above, in the present example, the analysis target specifier 32 may specify as the analysis target at least one of the other terrestrial communication cells TC1 to TC3 near the non-terrestrial communication cell NTC where the emergency report has been made. For example, all the terrestrial communication cells TC1 to TC3 near the non-terrestrial communication cell NTC where the emergency report has been made, may be specified as the analysis target, regardless of the position (the second position P2, the third position P3, or the fourth position P4).

Alternatively, of the plurality of terrestrial communication cells TC1 to TC3 near the non-terrestrial communication cell NTC where the emergency report has been made, only those within a predetermined distance from each position P2 to P4 where the emergency report has been made may be specified as the analysis target. For example, for an emergency report from the second position P2, only the first terrestrial communication cell TC1 near the second position P2 may be specified as the analysis target. For an emergency report from the third position P3, only the second terrestrial communication cell TC2 near the third position P3 may be specified as the analysis target. For an emergency report from the fourth position P4, only the third terrestrial communication cell TC3 near the fourth position P4 may be specified as the analysis target.

It should be noted that, as mentioned above, it is preferable that the specification of the analysis target area by the analysis target specifier 32 is made in units of a communication cell, which is also the basic administrative unit in the core network CN. However, the analysis target specifier 32 may specify an analysis target area of any shape or coverage (e.g., a substantially circular area within a predetermined distance from each position P2 to P4 where the communication device 2 has made an emergency report), by a geographical boundary that can be freely set independently of a boundary of a communication cell.

In order to specify the analysis target (e.g., the terrestrial communication cells TC1 to TC3) in accordance with the positions P2 to P4 where the emergency report has been made as described above, the analysis target specifier 32 typically provided in the core network CN, needs to recognize the approximate position where the emergency report has been made. Therefore, it is preferable for the analysis target specifier 32 to acquire various position information suggesting the position of the communication device 2 that has made the emergency report, from the communication device 2 itself, the RAN, the core network CN, and the like.

For example, the analysis target specifier 32 may acquire past or present positioning information from a positioning sensor based on the GPS or the like provided in the communication device 2 itself that has made the emergency report. Besides, the analysis target specifier 32 can estimate the movement or the current position of the communication device 2, by referring to various activity histories of the communication device 2 (e.g., the history of communication cells to which the communication device 2 has been connected up until the present time) recorded in the core network CN or the like. It should be noted that it would be possible that the position information of the communication device 2 as described above, may be collected and/or analyzed by an AI/ML function such as the NWDAF described below with respect to the jurisdictional area estimator 33. In such a case, all or some of the functions of the analysis target specifier 32 as described above, may be realized by the jurisdictional area estimator 33, which may be realized by an AI/ML function such as the NWDAF. In particular, if all of the functions of the analysis target specifier 32 are realized by the jurisdictional area estimator 33, it is not necessary to provide the analysis target specifier 32.

It is preferable that the specification of the analysis target time and/or the analysis target area by the analysis target specifier 32 as described above, is made based on administrative information such as a table prepared in advance in the IMS or the like where the analysis target specifier 32 is realized. Specifically, in specifying the analysis target time, the past time period before an emergency report or the future time period after an emergency report is specified in advance in the administrative information. For example, a past and/or future time period of a predetermined length or a predetermined range, such as "one hour before the emergency report" or "30 minutes after the emergency report", is specified in advance in the administrative information as the analysis target time. As in such an example, the analysis target time specified in the administrative information, may be a fixed time period in the past and/or the future relative to the time or the time period when the emergency report is made. However, as described below, such fixed time periods can be flexibly updated based on the estimation result of the jurisdictional area estimator 33 and the like.

Similarly, in specifying the analysis target area, the area (e.g., the terrestrial communication cells TC1 to TC3) different from an area where an emergency report is made (e.g., the non-terrestrial communication cell NTC or the positions P2 to P4) is specified in advance in the administrative information. For example, for the non-terrestrial communication cell NTC as the communication cell where the communication device 2 makes an emergency report, the other communication cell (e.g., the terrestrial communication cells TC1 to TC3) to be specified as the analysis target area by the analysis target specifier 32, may be specified in advance in the administrative information. Specifically, as in the aforementioned example, all the terrestrial communication cells TC1 to TC3 near the non-terrestrial communication cell NTC where an emergency report is made, may be specified in advance in the administrative information as the analysis target area or the analysis target communication cell, regardless of the position (the second position P2, the third position P3, or the fourth position P4).

Alternatively, for an emergency report from the area including the second position P2, only the first terrestrial communication cell TC1 near such an area may be specified in advance in the administrative information as the analysis target area or the analysis target communication cell. For an emergency report from the area including the third position P3, only the second terrestrial communication cell TC2 near such an area may be specified in advance in the administrative information as the analysis target area or the analysis target communication cell. For an emergency report from the area including the fourth position P4, only the third terrestrial communication cell TC3 near such an area may be specified in advance in the administrative information as the analysis target area or the analysis target communication cell.

As in the above example, the analysis target area or the analysis target communication cell specified in the administrative information, may be a fixed area or communication cell near the position or the area where the emergency report is made. However, as described below, such a fixed area or communication cell can be flexibly updated based on the estimation result of the jurisdictional area estimator 33 and the like.

As described above, in the administrative information such as a table that can be referenced when the analysis target specifier 32 specifies the analysis target time and/or the analysis target area, a fixed time period in the past and/or the future may be related to the "present" time or time period when an emergency report is made, and/or a fixed area or communication cell nearby may be related to the "present" position or area where an emergency report is made. The analysis target specifier 32 that can refer to such a table and the like, can quickly specify, based on the "present" time and/or area of the emergency report detected by the emergency report detector 31, the different analysis target time and/or analysis target area.

The jurisdictional area estimator 33 estimates the jurisdictional area where the communication device 2 that has made the emergency report detected by the emergency report detector 31 is located, based on an analysis of at least either of the analysis target time (a time in the past and/or the future) and the analysis target area (an adjacent area and/or an adjacent communication cell) specified by the analysis target specifier 32.

For example, the estimation result of the jurisdictional area estimator 33 may include geographic information concerning the jurisdictional area where the communication device 2 that has made the emergency report detected by the emergency report detector 31 is located, based on the analysis of at least either of the analysis target time and the analysis target area specified by the analysis target specifier 32. Here, the geographic information concerning the jurisdictional area, may be an identifier (Geographical Identifier or Geographical Identifier Indicator) of the geographic location of the representative point of the jurisdictional area (e.g., the location of the emergency response agency having jurisdiction over such a jurisdictional area), or may be an identifier (Geographical Identifier or Geographical Identifier Indicator) of the geographic position of the communication device 2 that has made the emergency report within such a jurisdictional area. Besides, some of such geographical information concerning the jurisdictional area may be provided to the jurisdictional area estimator 33 by the analysis target specifier 32, for the derivation or the estimation of the jurisdictional area by the jurisdictional area estimator 33.

The jurisdictional area estimator 33 is preferably realized in the core network CN, and can be configured by various artificial intelligence (AI)/machine learning (ML) functions in the core network CN, such as the NWDAF (Network Data Analytics Function) introduced in the 5GC. The NWDAF is responsible for collecting and analyzing data on the network including 5G. Specifically, the NWDAF collects and accumulates activity history information, mobility information (or movement information), measurement information, and the like of a large number of communication devices 2 and other objects connected to the mobile communication network, and utilizes the analysis results for traffic control on the mobile communication network, for example. The functions provided by the NWDAF to analyze the mobility information of a large number of communication devices 2 and other objects are also referred to as the mobility analytics. It should be noted that, in other wireless communication systems, including those of later generations than 5G, functions similar to the NWDAF might be provided under different names. Such similar functions may be utilized in the present embodiment instead of or in addition to the NWDAF.

If the jurisdictional area estimator 33 is configured by the NWDAF, at least some of the following template information is provided from the analysis target specifier 32 configured by the IMS or the like:

Analytics ID: In the present embodiment, "UE Mobility" is specified for the analysis of the mobility information of the communication device 2 (UE) (that has made the emergency report);

Target of analytics reporting: Whether the number of the communication devices 2 that have made the emergency reports is "single" or "multiple" is specified. For example, "multiple" is specified, in case the emergency reports have been made substantially at the same time from a large number of communication devices 2 during a crowd accident and the like;

Area information: The present position of the communication device 2 that has made the emergency report, or the analysis target area (Area of Interest and/or Visited AOI) in the past or the future, as specified by the analysis target specifier 32 accordingly, is specified; and Time information: The analysis target time (Analytics Target Period) in the past or the future, as specified by the analysis target specifier 32, is specified.

For example, if an emergency report has been made at the second position P2, the analysis target specifier 32 specifies the first terrestrial communication cell TC1 near the second position P2 as the analysis target area, and specifies the past time period of "one hour before the emergency report" as the analysis target time. Then, the jurisdictional area estimator

33 analyzes the first terrestrial communication cell TC1 over the past time period of "one hour before the emergency report", as specified as the analysis targets by the analysis target specifier 32. If, as a result of such an analysis, it is found that the communication device 2 that has made the emergency report at the second position P2 has been connected to the first terrestrial communication cell TC1 within "one hour before the emergency report", it is highly likely that the communication device 2 is still located in the first jurisdictional area JA1 that includes the first terrestrial communication cell TC1. Thus, the jurisdictional area estimator 33 can estimate the jurisdictional area where the communication device 2 that has made the emergency report is located to be the first jurisdictional area JA1.

For example, if an emergency report has been made at the third position P3, the analysis target specifier 32 specifies the first terrestrial communication cell TC1 and the second terrestrial communication cell TC2 near the third position P3 as the analysis target areas, and specifies the past time period of "30 minutes before the emergency report" and the future time period of "30 minutes after the emergency report" as the analysis target times. Then, the jurisdictional area estimator 33 analyzes both the first terrestrial communication cell TC1 over the past time period of "30 minutes before the emergency report", as specified as the analysis targets by the analysis target specifier 32, and the second terrestrial communication cell TC2 over the future time period of "30 minutes after the emergency report", as specified as the analysis targets by the analysis target specifier 32. If, as a result of such analyses, it is estimated that the communication device 2 that has made the emergency report at the third position P3, has not been connected to the first terrestrial communication cell TC1 within "30 minutes before the emergency report", and is going to be connected to the second terrestrial communication cell TC2 within "30 minutes after the emergency report", it is highly likely that the communication device 2 is located in the second jurisdictional area JA2 that includes the second terrestrial communication cell TC2 to which the communication device 2 is estimated to be connected at the future time. Thus, the jurisdictional area estimator 33 can estimate the jurisdictional area where the communication device 2 that has made the emergency report is located to be the second jurisdictional area JA2.

For example, if an emergency report has been made at the fourth position P4, the analysis target specifier 32 specifies the third terrestrial communication cell TC3 near the fourth position P4 as the analysis target area, and specifies the future time period of "one hour after the emergency report" as the analysis target time. Then, the jurisdictional area estimator 33 analyzes the third terrestrial communication cell TC3 over the future time period of "one hour after the emergency report", as specified as the analysis targets by the analysis target specifier 32. If, as a result of such an analysis, it is estimated that the communication device 2 that has made the emergency report at the fourth position P4 is going to be connected to the third terrestrial communication cell TC3 within "one hour after the emergency report", it is highly likely that the communication device 2 is located in the third jurisdictional area JA3 that includes the third terrestrial communication cell TC3 to which the communication device 2 is estimated to be connected at the future time. Thus, the jurisdictional area estimator 33 can estimate the jurisdictional area where the communication device 2 that has made the emergency report is located to be the third jurisdictional area JA3.

As described above, even if the non-terrestrial communication cell NTC where the emergency report has been made includes the plurality of jurisdictional areas JA1 to JA3, the jurisdictional area estimator 33 configured by the NWDAF or the like, can estimate the jurisdictional area (one of JA1 to JA3) where the emergency report has been made, based on the analysis of the past and/or future analysis target time and the geographically adjacent analysis target area. The connection controller 34 connects the emergency report detected by the emergency report detector 31, to one of the first to third emergency response agencies of one of the jurisdictional areas JA1 to JA3 estimated by the jurisdictional area estimator 33.

It should be noted that, the other communication cell (e.g., the terrestrial communication cells TC1 to TC3) and the like to be specified as the analysis target by the analysis target specifier 32, for each position P2 to P4 or a communication cell (e.g., the non-terrestrial communication cell NTC) where the communication device 2 has made the emergency report, may be updated based on the estimation result of the jurisdictional area estimator 33. In other words, the administrative information such as the table to be referenced when the analysis target specifier 32 specifies the analysis target time and/or the analysis target area, may be updated from time to time based on feedback such as the estimation result from the jurisdictional area estimator 33. Besides, the administrative information such as the table to be referenced when the analysis target specifier 32 specifies the analysis target time and/or the analysis target area, may be updated based on the result of the mobility analytics that can be acquired from the NWDAF, which may be unrelated to the emergency report (i.e., during normal time).

In the above embodiment, the NWDAF where the jurisdictional area estimator 33 is realized, performs the analysis in response to the analysis target time and the analysis target area that have been externally specified, according to the present 3GPP standard. In order to identify the location of an emergency report as described above, it would be possible to input the emergency report as detected by the emergency report detector 31 directly to the NWDAF. However, in such a case, the analysis target time and the analysis target area are the "present" time and area. Therefore, for an emergency report made in the non-terrestrial communication cell NTC that includes the plurality of jurisdictional areas JA1 to JA3 as in the example in FIG. 7, the jurisdictional area (one of JA1 to JA3) where the emergency report has been made cannot be properly estimated, only from the pinpoint "present" analysis target time and analysis target area.

In contrast, in the present embodiment, since the analysis target specifier 32 configured by the IMS or the like, specifies the past and/or future analysis target time and the geographically adjacent analysis target area, the jurisdictional area estimator 33 configured by the NWDAF or the like, can appropriately estimate the jurisdictional area (one of JA1 to JA3) where the emergency report has been made, through the analysis of the behavior of the communication device 2 before the emergency report (past) and/or after the emergency report (future).

It should be noted that the function of the NWDAF, which requires the specification of the analysis target time and the analysis target area from an external source (e.g., the IMS) according to the present 3GPP standard, may be extended to allow itself to specify the analysis target time and the analysis target area. For example, if the specification of the analysis target (the analysis target time and/or the analysis target area) by the analysis target specifier 32 is insufficient, the jurisdictional area estimator 33 configured by the NWDAF or the like, may estimate the jurisdictional area (one of JA1 to JA3) where the communication device 2 that has made the emergency report is located, based on the analysis of the analysis target specified by compensating for the insufficiency itself. Besides, all of the functions of the analysis target specifier 32 may be incorporated into the jurisdictional area estimator 33 configured by the NWDAF or the like. In such a case, the jurisdictional area estimator 33 can estimate the jurisdictional area (one of JA1 to JA3) where the communication device 2 is located, based on the analysis of a time and an area different from at least either of the time and the area in which the communication device 2 has made the emergency report.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.

1. A communication control apparatus comprising at least one processor that performs, by an analysis target specifier, specifying an analysis target for estimating a jurisdictional area where a communication device is located, when detecting that a communication cell where the communication device has made an emergency report includes the jurisdictional areas of a plurality of emergency response agencies.

2. The communication control apparatus according to item 1, wherein the analysis target specifier specifies as the analysis target a time and an area different from at least either of the time and the area in which the communication device has made the emergency report.

3. The communication control apparatus according to item 2, wherein the analysis target specifier specifies as the analysis target a time in the past before the time when the communication device has made the emergency report or a time in the future after the time when the communication device has made the emergency report.

4. The communication control apparatus according to item 2 or 3, wherein the analysis target specifier specifies as the analysis target other communication cell near the communication cell where the communication device has made the emergency report, which includes a jurisdictional area of a single emergency response agency.

5. The communication control apparatus according to item 4, wherein for the communication cell where the communication device has made the emergency report, the other communication cell to be specified as the analysis target by the analysis target specifier is defined in advance.

6. The communication control apparatus according to any of items 2 to 5, wherein the analysis target specifier specifies as the analysis target other area within a predetermined distance from the area where the communication device has made the emergency report.

7. The communication control apparatus according to any of items 1 to 6, wherein the analysis target specifier is configured by the IMS (IP Multimedia Subsystem).

8. The communication control apparatus according to any of items 2 to 7, wherein the at least one processor performs: by an emergency report detector, detecting an emergency report from a communication device within a communication cell that includes jurisdictional areas of a plurality of emergency response agencies;

by a jurisdictional area estimator, estimating the jurisdictional area where the communication device is located, based on an analysis of at least either of the time and the area as the analysis target; and by a connection controller, connecting the emergency report to the emergency response agency of the estimated jurisdictional area.

9. The communication control apparatus according to item 8,wherein the estimation result of the jurisdictional area estimator includes geographic information concerning the jurisdictional area where the communication device is located, based on the analysis of at least either of the time and the area as the analysis target.

10. The communication control apparatus according to item 8or 9, wherein the analysis target specifier specifies as the analysis target other communication cell near the communication cell where the communication device has made the emergency report, which includes a jurisdictional area of a single emergency response agency, and for the communication cell where the communication device has made the emergency report, the other communication cell to be specified as the analysis target by the analysis target specifier is updated based on the estimation result of the jurisdictional area estimator.

11. The communication control apparatus according to any of items 8 to 10, wherein, if the specification of the analysis target by the analysis target specifier is insufficient, the jurisdictional area estimator estimates the jurisdictional area where the communication device is located, based on an analysis of an analysis target specified by compensating for the insufficiency.

12. The communication control apparatus according to any of items 8 to 11, wherein the jurisdictional area estimator is configured by the NWDAF (Network Data Analytics Function).

13. The communication control apparatus according to any of items 1 to 12, wherein the communication cell including the jurisdictional areas of the plurality of emergency response agencies is provided by a communication satellite flying in outer space.

14. A communication control apparatus comprising at least one processor that performs:

by an emergency report detector, detecting an emergency report from a communication device within a communication cell that includes jurisdictional areas of a plurality of emergency response agencies;

by a jurisdictional area estimator, estimating the jurisdictional area where the communication device is located, based on an analysis of a time and an area different from at least either of the time and the area in which the communication device has made the emergency report; and by a connection controller, connecting the emergency report to the emergency response agency of the estimated jurisdictional area.

15. A communication control method performing, specifying an analysis target for estimating a jurisdictional area where a communication device is located, when detecting that a communication cell where the communication device has made an emergency report includes the jurisdictional areas of a plurality of emergency response agencies.

16. A computer-readable medium storing a communication control program causing a computer to perform, specifying an analysis target for estimating a jurisdictional area where a communication device is located, when detecting that a communication cell where the communication device has made an emergency report includes the jurisdictional areas of a plurality of emergency response agencies.

The application claims priority of Japanese patent application 2023-001294, filed on Jan. 6, 2023, which is hereby incorporated by reference in its entirety.

The present disclosure relates to specifying analysis target in estimation of jurisdictional area for emergency report.

What is claimed is:

1. A communication control apparatus comprising at least one processor that performs, by an analysis target specifier, specifying an analysis target for estimating a jurisdictional area where a communication device is located, when detecting that a communication cell where the communication device has made an emergency report includes the jurisdictional areas of a plurality of emergency response agencies, wherein:

the analysis target specifier specifies as the analysis target a time and an area different from at least either of the time and the area in which the communication device has made the emergency report, the at least one processor performs:

by an emergency report detector, detecting the emergency report from the communication device within the communication cell that includes the jurisdictional areas of the plurality of emergency response agencies;

by a jurisdictional area estimator, estimating the jurisdictional area where the communication device is located, based on an analysis of at least either of the time and the area as the analysis target; and by a connection controller, connecting the emergency report to the emergency response agency of the estimated jurisdictional area, the analysis target specifier specifies as the analysis target another communication cell near the communication cell where the communication device has made the emergency report, which includes a jurisdictional area of a single emergency response agency, and for the communication cell where the communication device has made the emergency report, the other communication cell to be specified as the analysis target by the analysis target specifier is updated based on the estimation result of the jurisdictional area estimator.

2. The communication control apparatus according to claim 1, wherein the analysis target specifier specifies as the analysis target a time in the past before the time when the communication device has made the emergency report or a time in the future after the time when the communication device has made the emergency report.

3. The communication control apparatus according to claim 1, wherein for the communication cell where the communication device has made the emergency report, the other communication cell to be specified as the analysis target by the analysis target specifier is defined in advance.

4. The communication control apparatus according to claim 1, wherein the analysis target specifier specifies as the analysis target other area within a predetermined distance from the area where the communication device has made the emergency report.

5. The communication control apparatus according to claim 1, wherein the analysis target specifier is configured by the IMS (IP Multimedia Subsystem).

6. The communication control apparatus according to claim 1, wherein the estimation result of the jurisdictional area estimator includes geographic information concerning the jurisdictional area where the communication device is located, based on the analysis of at least either of the time and the area as the analysis target.

7. The communication control apparatus according to claim 1, wherein, if the specification of the analysis target by the analysis target specifier is insufficient, the jurisdictional area estimator estimates the jurisdictional area where the communication device is located, based on an analysis of an analysis target specified by compensating for the insufficiency.

8. The communication control apparatus according to claim 1, wherein the jurisdictional area estimator is configured by the NWDAF (Network Data Analytics Function).

9. The communication control apparatus according to claim 1, wherein the communication cell including the jurisdictional areas of the plurality of emergency response agencies is provided by a communication satellite flying in outer space.

10. A communication control apparatus comprising at least one processor that performs:

by an emergency report detector, detecting an emergency report from a communication device within a communication cell that includes jurisdictional areas of a plurality of emergency response agencies;

by a jurisdictional area estimator, estimating the jurisdictional area where the communication device is located, based on an analysis of a time and an area different from at least either of the time and the area in which the communication device has made the emergency report;

by a connection controller, connecting the emergency report to the emergency response agency of the estimated jurisdictional area; and by an analysis target specifier, specifying an analysis target for estimating a jurisdictional area where the communication device is located, when detecting that the communication cell where the communication device has made the emergency report includes the jurisdictional areas of a plurality of emergency response agencies, wherein:

the analysis target specifier specifies as the analysis target another communication cell near the communication cell where the communication device has made the emergency report, which includes a jurisdictional area of a single emergency response agency, and for the communication cell where the communication device has made the emergency report, the other communication cell to be specified as the analysis target by the analysis target specifier is updated based on the estimation result of the jurisdictional area estimator.

11. A communication control method performing, specifying an analysis target for estimating a jurisdictional area where a communication device is located, when detecting that a communication cell where the communication device has made an emergency report includes the jurisdictional areas of a plurality of emergency response agencies;

specifying as the analysis target a time and an area different from at least either of the time and the area in which the communication device has made the emergency report;

detecting the emergency report from the communication device within the communication cell that includes the jurisdictional areas of the plurality of emergency response agencies;

estimating the jurisdictional area where the communication device is located, based on an analysis of at least either of the time and the area as the analysis target; and connecting the emergency report to the emergency response agency of the estimated jurisdictional area; and specifying as the analysis target another communication cell near the communication cell where the communication device has made the emergency report, which includes a jurisdictional area of a single emergency response agency, wherein, for the communication cell where the communication device has made the emergency report, the other communication cell to be specified as the analysis target by the analysis target specifier is updated based on the estimation result of the jurisdictional area estimator.

* * * * *